United States Patent [19]

Collonia

[11] 4,170,274

[45] Oct. 9, 1979

[54] DEVICE FOR REGULATING THE TRAVELING SPEED OF A MOTOR VEHICLE

[75] Inventor: Harald Collonia, Königstein, Fed. Rep. of Germany

[73] Assignee: VDO, Adolf Schindling AG, Frankfurt am Main, Fed. Rep. of Germany

[21] Appl. No.: 834,065

[22] Filed: Sep. 16, 1977

[30] Foreign Application Priority Data

Sep. 23, 1976 [DE] Fed. Rep. of Germany ....... 2642753
Oct. 23, 1976 [DE] Fed. Rep. of Germany ....... 2648031

[51] Int. Cl.² .............................................. B60K 27/00
[52] U.S. Cl. ..................................... 180/179; 180/176; 303/95; 324/161
[58] Field of Search ........................... 180/105 E, 108; 324/161; 123/97 R, 99, 102; 303/95; 340/62, 53; 317/5

[56] References Cited

U.S. PATENT DOCUMENTS

| 2,976,946 | 3/1961 | Denman | 180/108 |
| 3,070,185 | 12/1962 | Fales | 180/108 |
| 3,270,199 | 8/1966 | Smith | 324/161 X |
| 3,704,382 | 11/1972 | Huntzinger | 324/161 X |
| 3,750,128 | 7/1973 | Sapir | 180/105 E X |
| 3,804,193 | 4/1974 | Ikuta | 180/105 E |
| 4,050,551 | 9/1977 | Schmedemann | 303/95 X |

Primary Examiner—Charles E. Frankfort
Attorney, Agent, or Firm—Otto John Munz

[57] ABSTRACT

A device for regulating the traveling speed of a motor vehicle, compares a signal proportional to the actual speed of the vehicle with a signal proportional to the set or desired speed, and superposes on one or both of the signals a periodic signal having at least one periodically recurring section of non-linear characteristic, to obtain a control signal whose amplitude is modulated as a function of the magnitude of deviation between the actual speed signal and the set speed signal, and the control signal is transmitted to a control stage influencing the fuel-air mixture supplied to the engine of the vehicle.

8 Claims, 2 Drawing Figures

DEVICE FOR REGULATING THE TRAVELING SPEED OF A MOTOR VEHICLE

BACKGROUND OF THE INVENTION

The invention relates to a device for regulating the traveling speed of a motor vehicle by means of an electric regulator which compares the prevailing actual speed with a desired rated speed and in response to a deviation of the actual or instantaneous speed from the desired speed gives a signal that depends upon the magnitude of the said deviation to a control stage which controls the proportion of the fuel-air mixture supplied to the vehicle's engine.

In known devices of this kind, speed variations of several kilometers per hour occur in the regulated traveling operation, i.e., the vehicle does not move with a constant speed but with a speed that fluctuates about an average set value. This fluctuation can be reduced by an enlargement of the P band of the regulator, to a no longer disturbing quantity, but thereby the regulator becomes as a whole less sensitive, so that in the case of load variations, as those resulting, e.g., from variations of the road conditions, a greater deviation of the actual value from the rated or desired value occurs, which is undesirable. To avoid this, a certain maximum deviation of the actual speed about an average set or adjusted value has hitherto been deemed acceptable.

SUMMARY OF THE INVENTION

It is the purpose of the invention to provide means and measures by which, on the one hand, speed variations under normal operating conditions are eliminated and, on the other hand, the smallest possible deviations of the actual value from the rated or desired value in the case of load variations occur. The aforesaid purpose is carried into effect by a relatively simple and inexpensive construction.

According to the invention, this problem is solved, on the basis of the device described above, in such a way that the rated value input signal and/or the actual value input signal of the regulator have superposed thereon a periodic frequency signal.

By the additive superposition of the periodic frequency signal to the deviation signal, the result is achieved that the amplification or the P band of the regulator varies as a function of the magnitude of the deviation in such a manner that with increasing deviation the P band diminishes and with decreasing deviation the P band increases. Thus, speed variations in the regulated state, and larger deviations at load variations can be safely eliminated.

In one embodiment of the invention the periodic frequency signal has a constant or nearly constant frequency. A particularly advantageous embodiment consists in that a frequency signal with varying frequency is used. This makes it possible to replace frequency generators such as are usually required for the generation of frequency signals of constant or nearly constant frequency by considerably simpler and cheaper frequency generators, or even to dispense entirely with such frequency generators.

The invention is based on the knowledge that the frequency of the periodic signal does not affect the performance of the regulator. When, in other words, the shape and the amplitude of the periodic signal are fixed, the conduct of the regulator is not affected by a change in the frequency of the signal as long as shape and amplitude are retained. This makes it possible to employ frequency generators which, on account of lacking frequency constancy, could normally not be employed.

In special cases the employment of a frequency generator can entirely be dispensed with, e.g., in the case of an actual value or rated value signal superposed with a hum voltage. In such a case the hum voltage is employed as the periodic signal.

It has proved suitable to choose the smallest occurring frequency of the periodic signal in such a way that it is several times larger than the average variation frequency of the actual speed or value, in order to make sure that the periodic signal or varying frequency does not affect the regulation accuracy of the regulator.

According to one embodiment of the invention, the action upon the rated value input signal and/or the actual value input signal of the regulator takes place by a saw-toothed signal. In such an embodiment, the P band varies linearly as a function of the deviation.

A dependency particularly favorable for the present purposes, of the P band on the deviation is achieved when the regulator is acted upon by a sinusoidal signal. In such an embodiment the P band varies between its highest and its lowest value non-linearly and in a continuously narrowing manner.

According to a further embodiment of the invention, the rated value input and/or the actual value input of the regulator is acted upon by pulses of varying polarity. In the case of a superposition of such a signal to the deviation, the regulator operates like a three-point regulator, i.e., the P band varies between its highest and its lowest value nonlinearly and in a continuously dropping manner.

In the embodiments described above, and also in others, the coordination between P band and deviation can be carried out so as to be chosen within a wide range, by variation of the amplitude of the periodic signal. Thus, it is possible to adapt the regulating performance of the device by way of shape and amplitude of the periodic signal to the greatest variety of requirements.

For the generation of the periodic signal, customary frequency generators can be employed. In a device with a control stage which contains an electromagnetic system with an armature that actuates the valve of a pneumatic adjustment drive, and an excitation coil as well as a frequency generator for generating a low-frequency-pulsated induction current, it is most practical to use this frequency generator for generating the periodic signal. Such a measure entails the advantage that not only is the necessity for a separate frequency generator for the periodic signal eliminated but also the structural elements of the regulator feedback customary in such a device are no longer necessary in the regulator control of the invention.

DETAILED DESCRIPTION OF THE PREFERRED EMBODIMENTS

Figure 1:
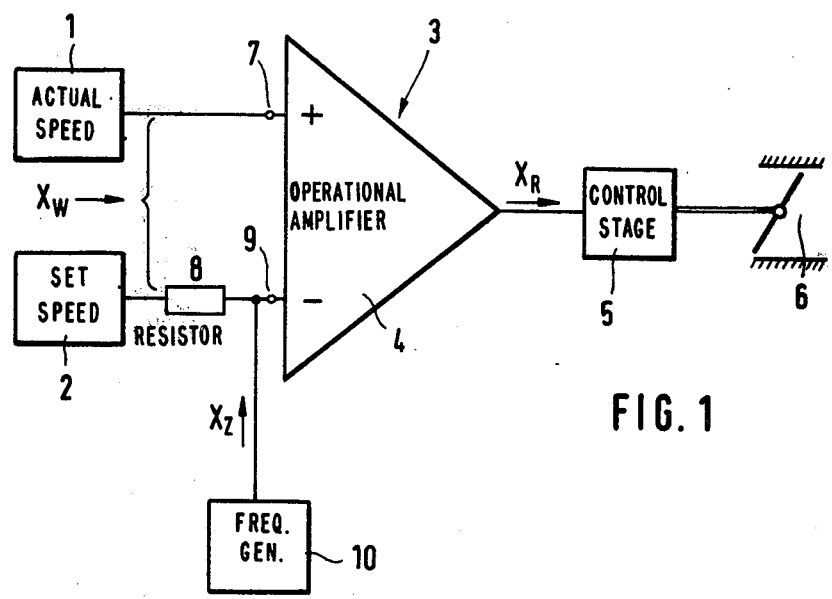
FIG. 1 is a block diagram of the device.

As shown in FIG. 1, the traveling speed regulating device comprises essentially a speed transmitter 1 which supplies a signal corresponding to the prevailing actual speed of the vehicle, a transmitter of the rated speed 2 which transmits a signal corresponding to the desired rated speed, and an electric regulator 3 in the form of an operational amplifier 4 whose output is connected to a control stage 5. Control stage 5 contains a conventional pneumatic adjustment drive with which the throttle valve 6 of the automotive engine (not shown) is coupled.

Speed transmitter 1 is connected to the actual value input 7 of operational amplifier 4, and rated speed transmitter 2 is connected via a resistor 8 to the rated value input 9 of the operational amplifier. The rated value input 9 is, furthermore, connected to a frequency generator 10 which transmits a sinusoidal signal $X_z$ of constant frequency which is additively superposed to the deviation $X_W$ between actual value input and rated value input.

Figure 2:
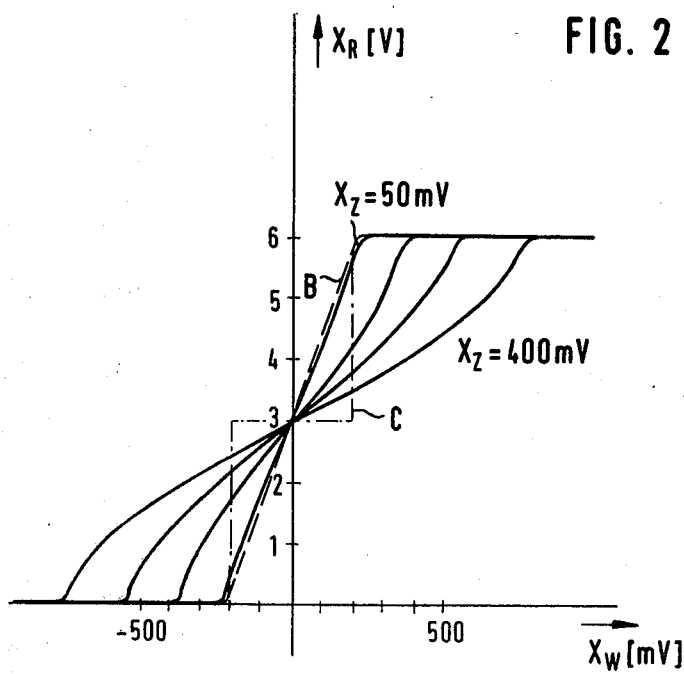
FIG. 2 is a graph showing the relationship between the deviation and the regulator output signal at various periodic signals.

The relationship between regulator output signal $X_R$ and deviation $X_W$ is shown in the diagram of FIG. 2. As can be seen, regulator output signal $X_R$ increases steadily and progressively with increasing positive deviation $X_W$, and it decreases steadily and degressively with increasing negative deviation $X_W$, progression and degression being a function of the amplitude of a signal $X_Z$ transmitted by frequency generator 10. Moreover, from the characteristics it can be learned that the regulator presents a relatively small amplification at small deviations $X_W$, and a relatively large amplification at large deviations $X_W$. The frequency of the signals transmitted by frequency generator 10 amounts to 40 Hz.

With employment of such a regulator, control stage 5 with the pneumatic adjustment drive can be constructed in a substantially simpler manner and with fewer structural elements in comparison to that of known regulators, and a separate adjustment of the adjustment drive can be dispensed with, since any possible changes, within the scope of the production tolerances, of the adjustment drive can be balanced by way of the regulator. This presents a special advantage of the device of the invention.

I claim:

1. In a device for regulating the speed of a motor vehicle propelled by an internal combustion engine having valve means operable to regulate the air-fuel mixture supplied to the engine, first means generating a first signal by and in response to the instantaneous speed of the vehicle and proportional thereto, second means generating a second signal proportional to the preselected desired speed of the vehicle, third means generating a periodic frequency signal having at least one periodically recurring section of nonlinear characteristic and connected to superpose the same on at least one of the first and second signals, an amplifier connected to said first, second and third means and supplying an amplitude modulated control signal proportional to any difference between the first and second signals, and a control stage connected to the output of said amplifier and controlled thereby for adjusting the valve means to maintain essentially constant the speed of the engine.

2. The device of claim 1, the frequency of the signal generated by said third means being essentially constant.

3. The device of claim 1, the frequency of the signal generated by said third means being variable.

4. The device of claim 3, the lowest frequency of the signal generated by said third means being several times greater than the average variation frequency of said first means.

5. The device of claim 4, the pulses generated by said third means being of varying polarity.

6. The device of claim 1, the output signal generated by said third means being of sawtooth form.

7. The device of claim 1, the output signal generated by said third means being of sinusoidal form.

8. The device as claimed in claim 1, wherein the amplifier comprises an operational amplifier, and the third means is connected to superpose its signal on the signal generated by the second means, said control signal having its amplitude modulated such that for increasing deviation, the amplification diminishes, and for decreasing deviation the amplification increases.

* * * * *